(12) United States Patent
He et al.

(10) Patent No.: US 10,394,868 B2
(45) Date of Patent: Aug. 27, 2019

(54) GENERATING IMPORTANT VALUES FROM A VARIETY OF SERVER LOG FILES

(71) Applicant: International Business Machines Corporation, Armonk, NY (US)

(72) Inventors: Miao He, Beijing (CN); Jin Feng Li, Beijing (CN); Chang Rui Ren, Beijing (CN); Bing Shao, Beijing (CN); Ming Xie, Beijing (CN); Tian Zhi Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 679 days.

(21) Appl. No.: 14/921,288

(22) Filed: Oct. 23, 2015

(65) Prior Publication Data
US 2017/0116330 A1  Apr. 27, 2017

(51) Int. Cl.
| G06F 7/00 | (2006.01) |
| G06F 16/35 | (2019.01) |
| G06F 16/33 | (2019.01) |
| G06F 16/332 | (2019.01) |

(52) U.S. Cl.
CPC ............ G06F 16/35 (2019.01); G06F 16/334 (2019.01); G06F 16/3322 (2019.01)

(58) Field of Classification Search
CPC .................................................. G06F 2201/87
USPC ....................................................... 707/648
See application file for complete search history.

(56) References Cited

U.S. PATENT DOCUMENTS

| 8,610,766 | B2* | 12/2013 | Ding | G06K 9/00335 |
| | | | | 348/150 |
| 8,682,032 | B2* | 3/2014 | Fan | G06K 9/6885 |
| | | | | 382/103 |
| 8,781,792 | B2* | 7/2014 | Visweswariah | G06F 17/5045 |
| | | | | 702/117 |
| 8,850,263 | B1 | 9/2014 | Yourtee et al. | |
| 8,924,328 | B1 | 12/2014 | Kozlovsky et al. | |
| 9,208,271 | B1* | 12/2015 | Meir | G06F 17/5045 |
| 9,459,911 | B2* | 10/2016 | Liu | G06F 9/54 |
| 9,836,293 | B2* | 12/2017 | Abrahams | G06F 8/53 |
| 9,977,779 | B2* | 5/2018 | Winer | G06F 17/2735 |

(Continued)

OTHER PUBLICATIONS

Eder, Johann et al., "A Data Warehouse for Workflow Logs", Engineering and Deployment of Cooperative Information Systems, vol. 2480 of the series Lecture Notes in Computer Science, Sep. 2, 2012, 15 pages.

(Continued)

*Primary Examiner* — Eliyah S. Harper
(74) *Attorney, Agent, or Firm* — Francis Lammes; Stephen J. Walder, Jr.; Grant A. Johnson

(57) ABSTRACT

A mechanism is provided for identifying suggestions as to which log files associated with data in a data warehouse to search for particular data. Features from the contents of a plurality of log files from a set of log files are selected. The plurality of log files are grouped based on the selected features. Using extracted log event sequences, a correlation between the log event sequences and a plurality of data transaction tables from a set of data transaction tables in the data warehouse is calculated. Suggestions as to which log files in the set of log files should be searched is then identified for particular data based on a business relevance value and a utilized data ratio.

17 Claims, 4 Drawing Sheets

(56) References Cited

U.S. PATENT DOCUMENTS

| | | |
|---|---|---|
| 2013/0325913 A1* | 12/2013 | Kusaka .............. G06F 11/3438 |
| | | 707/826 |
| 2014/0019458 A1 | 1/2014 | Walton |
| 2014/0282031 A1 | 9/2014 | Hinterbichler et al. |
| 2014/0344622 A1 | 11/2014 | Huang et al. |
| 2015/0094959 A1 | 4/2015 | Ning et al. |
| 2015/0154288 A1 | 6/2015 | Kim et al. |

OTHER PUBLICATIONS

Narkhede, Sayalee et al., "HMR Log Analyzer: Analyze Web Application Logs Over Hadoop MapReduce", International Journal of UbiComp (IJU), vol. 4, No. 3, Jul. 2013, 11 pages.

* cited by examiner

GENERATING IMPORTANT VALUES FROM A VARIETY OF SERVER LOG FILES

BACKGROUND

The present application relates generally to an improved data processing apparatus and method and more specifically to mechanisms for generating important values from a variety of server log files.

A server is both a running instance of some software that is capable of accepting requests from client computing devices and a computing device that executes such software. Servers operate within a client-server architecture, in which the servers execute computer programs to serve the requests of client programs on client computing devices. The service provided by such servers may be to share data, information, or hardware as well as software resources. Typical computing servers are, for example, database servers, file servers, mail servers, print servers, web servers, gaming servers, and application servers. While client programs may execute on the server, client programs typically connect to the server through a network.

In executing computer programs on the server as well as interacting with client programs through a network, servers generate one or more server logs comprising a list of each activity the server performs when interacting with data stored on the server. Thus, in a business with many servers, there may be tons and tons of log files. While these log files may seem to be just data that tracks the actions/interactions of the server, for an Information technology (IT) person, these log files provide insight as to how the server is operating, what data is being provided, whether the server is being under-tasked or over-tasked, or the like. One way to gather such insight into the log files of a server is through content analytics. In its simplest form, log content analytics is the science of making sense of computer-generated records. However, content analytics is much more expansive. That is, log content analytics is the application of analytics and semantic technologies to (semi-) automatically consume and analyze heterogeneous computer-generated log files to discover and extract relevant insights into a rationalized, structured form that enables a wide-range of business activities.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for identifying suggestions as to which log files associated with data in a data warehouse to search for particular data. The illustrative embodiment utilizes an identified data structure of a plurality of log files from a set of log files to select features from the contents of the log file. The illustrative embodiment groups log files in the set of log files together based on the selected features. From structured data of the grouped log files, the illustrative embodiment extracts log event sequences. The illustrative embodiment calculates a correlation between the log event sequences and a plurality of data transaction tables from a set of data transaction tables in the data warehouse. The illustrative embodiment utilizes a highest valued correlate log sequence for the plurality of data transaction tables to determine a business relevance value between the plurality of log files and a business analysis objective. The illustrative embodiment determines a utilized data ratio that indicates a proportion of the data in the data warehouse that has been interacted with as per the associated log file. The illustrative embodiment identifies suggestions as to which log files in the set of log files should be searched for particular data based on the business relevance value and the utilized data ratio.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
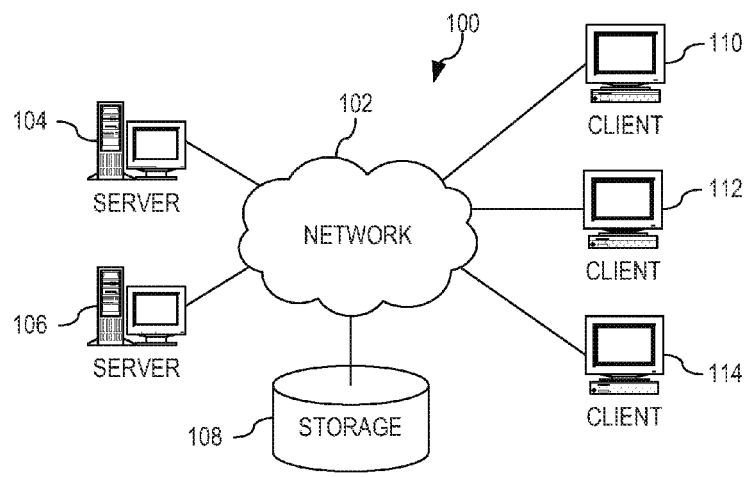
FIG. 1 is an example diagram of a distributed data processing system in which aspects of the illustrative embodiments may be implemented.

The illustrative embodiments provide mechanisms for generating important values from a variety of server log files. As noted above, within a particular server, there may be tons and tons of log files and these log files provide insight as to how the server is operating, what data is being provided, whether the server is being under-tasked or over-tasked, or the like. However, even for a medium-sized business serving, for example, 100 business systems that output an average two to three logs per system, with differing log file types, and with differing log file formats vary widely, such a business may generate more than 300 gigabytes (GBs) of log files per day. These log files may contain numerous abbreviations, customized descriptions, or the like, which make understanding such log files difficult. Furthermore, with information technology (IT) personnel coming into and leaving a business, finding an expert to explain old log files may be difficult and thus, delays any quick evaluation and/or analysis of the log files. That is, existing log files may be arcane, archaic in layout, have scarce domain knowledge, and/or have limited or even non-existent documentation. Therefore, formulating a correct query in order to analyze such log files may be challenging due to limited semantic understanding of the log file content. Thus, log content analytics solution must provide a mechanism to allow an end-user to understand the data.

However, in the absence of relevant documentation and knowledge domain, valuable time is wasted in pre-analysis in identifying items in or associated with the log files, such as log file type, log file format, data schema, data layout, or the like. Thus, the illustrative embodiments provide mechanisms for generating important values from a variety of server log files. That is, the mechanisms of the illustrative embodiments not only explore the data in the log files but also provide suggestions as to which log files should be searched for particular data. To do this, the mechanisms identify a relevance score between table identifiers in data dictionary and a given business analysis objective, the table identifiers identifying the data transaction tables in a data warehouse for which a set of log files are generated when the data is interacted with. For a plurality of log files from a set of log files log in the server, the mechanisms parse the log file for structured data. The mechanisms group the identified structured data and extract log event sequences from the grouped structured data. The mechanisms then calculate a correlation between the log event sequences and a plurality of data transaction tables from a set of data transaction tables in the data warehouse as well as a business relevance value between the plurality of log files and the business analysis objective. The mechanisms then calculate a rate at which the data in the data warehouse has been interacted with as per the log file. Based on the business relevance value between the log file and the business analysis objective and the rate at which the data in the data warehouse has been interacted with, the mechanisms identify suggestions as to which log files should be searched for particular data.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
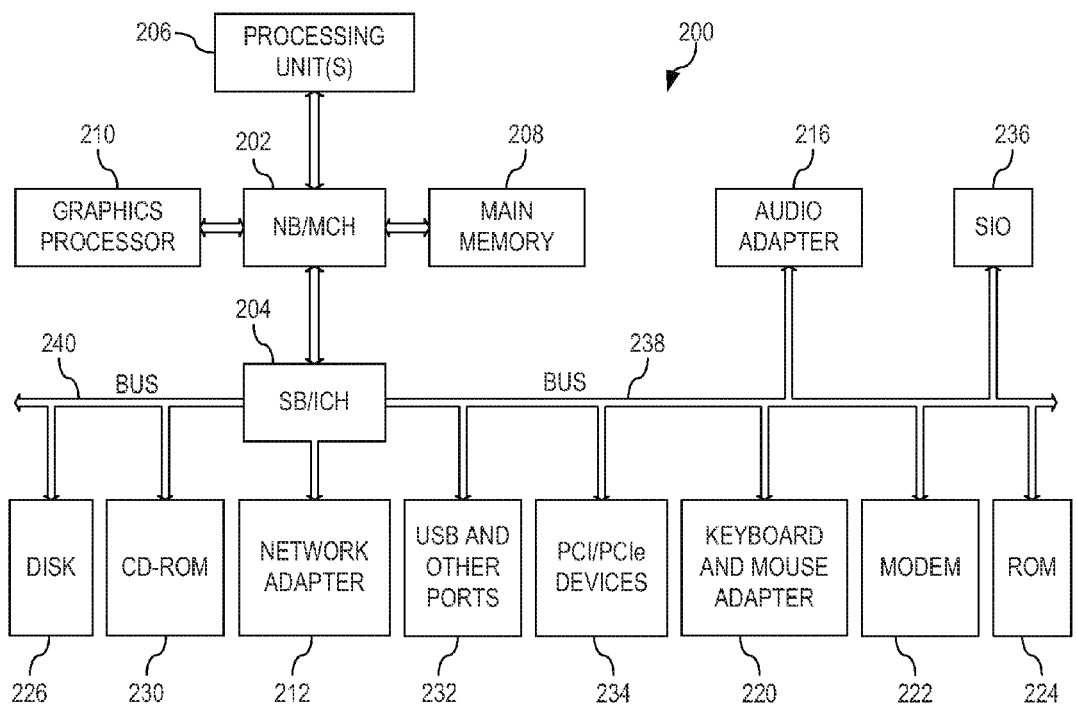
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a mechanism for exploring the data in the log files and providing suggestions as to which log files should be searched for particular data. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates exploring the data in the log files and providing suggestions as to which log files should be searched for particular data.

As noted above, the mechanisms of the illustrative embodiments utilize specifically configured computing devices, or data processing systems, to perform the operations for generating important values from a variety of server log files. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the generating important values from a variety of server log files.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
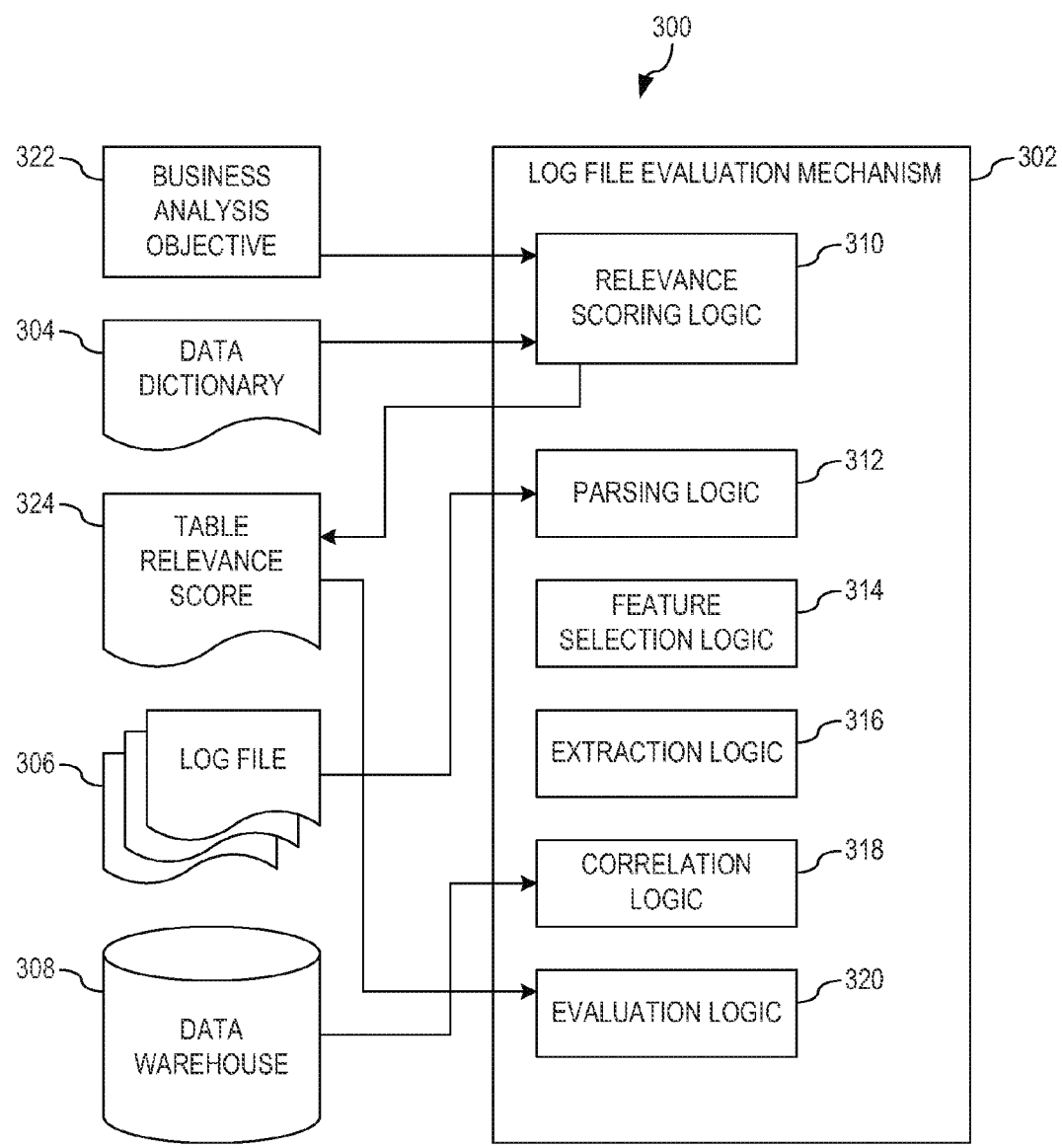
FIG. 3 illustrates a mechanism for generating important values from a variety of such server log files in accordance with one illustrative embodiment.

Again, data processing system 200 is an example of a computer, such as server 104 in FIG. 1, and as is illustrated in FIG. 1, such servers operate within a client-server architecture, in which the server executes computer programs to serve the requests of client programs on clients 110, 112, and 114. In executing the computer programs on the server as well as interacting with client programs through a network, servers generate one or more server logs comprising a list of each activity the server performs when interacting with data stored on the server. Thus, FIG. 3 illustrates a mechanism for generating important values from a variety of such server log files in accordance with one illustrative embodiment. Data processing system 300, which is a data processing system such as server 104 in FIG. 1 or data processing system 200 in FIG. 2, comprises log file evaluation mechanism 302 which interacts with data dictionary 304, a set of log files 306, and data warehouse 308. Log file evaluation mechanism 302 further comprises relevance scoring logic 310, parsing logic 312, feature selection logic 314, extraction logic 316, correlation logic 318, and evaluation logic 320. In order to explore the data in the set of log files 306 and provide suggestions as to which log files should be searched for particular data, relevance scoring logic 310 identifies a table relevance tr score 324 for a plurality of data transaction tables from a set of data transaction tables in data warehouse 308 based on an associated table identifier in data dictionary 304 and a given business analysis objective 322. That is, the table identifiers in data dictionary 304 identify data transaction tables in data warehouse 308 for which the set of log files 306 are generated when the data in data warehouse 308 is interacted with. For example, in a financial products recommendation scenario, the relevance score of a financial product transaction event table would have a higher relevance score than a third party depository table.

For a plurality of log files in the set of log files 306, parsing logic 312 parses the log file to identify structured data. That is, each of the log files in the set of log files 306 have some sort of structure. For instance, a web access log file for a web server specifies a Uniform Resource Identifier (URI), user agent, referrer, Internet Protocol (IP) address, and other fields for each entry as well as a format type of the log file, such as comma-separated values (CSV) file, tab delimited files, Apache web logs, or the like. Thus, parsing logic 312 utilizes one or more predefined rules or guides to parse the plurality of log files and identify patterns in the log files and thereby detect the structure(s) of the data in the log files. Utilizing the identified structure(s) of the plurality of log files, feature selection logic 314 selects features from the contents of the log file, which should be a useful subset of the dimensions of original data and thus, is used to classify potential log events. That is, data transaction tables in data warehouse 308 are organized around the business purposes and the log files associated with the data transaction tables are organized around the foreground/background events of interaction with the data transaction tables, which do not distinguish between business purposes. Thus, feature selection logic 314 uses unsupervised clustering to select the features from candidate fields in structured data of the set of log files 306. Based on the identified features, feature selection logic 314 groups similar log files based on one or more of Euclidean distance analysis, Manhattan distance analysis, text similarity, or the like.

From the structured data of the grouped log files, extraction logic 316 extracts log event sequences. That is, using the grouped structure log files, grouped by the identified features, extraction logic 316 orders each of the groups by time thereby generating a set of log event sequences. Utilizing the set of log event sequences, correlation logic 318 calculates a correlation between the log event sequences and the plurality of data transaction tables. To do this, correlation logic 318 reads metadata associated with the plurality of data transaction tables from data dictionary 304. Correlation logic 318 identifies the associated data transaction table in data warehouse 308 and reads data sequences from the data transaction table. Correlation logic 318 calculates the relevance score between each log event sequence and the plurality of data transaction tables in data warehouse 308 using the following correlation score function:

$$p(\text{log sequence, table}) = \frac{\sum_{i=0}^{N^{log}} \sum_{j=0}^{N^{table}} b(t_i^{log} - t_j^{table})}{\max(N^{log}, N^{table})}$$

with $$b(t_i - t_j) = \begin{cases} 1, & \text{for } |t_i - t_j| < \text{threshold} \\ 0, & \text{otherwise} \end{cases}$$

where p is the correlation score, b is an indicator function, t is a time that the log event is generated or the data in the table is recorded, i and j are integer values, and the threshold is a predetermined system design requirement. Based on the determined correlation, correlation logic 318 determines a relevance score r using the following correlation value function:

relevance score $r(\text{log file,table}) = \max(p(\text{log sequence, table}))$.

Thus, for each log event sequence and associated data transaction tables, correlation logic 318 determines the log sequence with the highest correlation value to a particular data transaction table in data warehouse 308. That is, for each log sequence related to a particular data transaction table in data warehouse 308, a correlation score is determined that is in the range from 0 to 1, where the higher the value the higher the relevance score between the log sequence and the data transaction table in data warehouse 308.

With the highest correlate log sequence determined for the plurality of data transaction tables in the data warehouse, evaluation logic 320 determines a business relevance value between the plurality of log files in the set of log files 306 and business analysis objective 322. The business relevance value indicates the relative degree of value of the log file to the business based on relational data, i.e. the potential value of the data in the log file with the higher the business relevance value, the higher the business coverage of the log file. To determine this business relevance value, evaluation logic 320 uses the following business relevance function:

$$\text{business relevance value(log file)} = \sum_{i=0}^{n} C(\text{log file}, table_i) * tr(table_i)$$

where tr is the table relevance score 324, i is an integer value, and C is an indicator function and is determined using the following:

$$C(\text{log file}, table_i) = \begin{cases} r(\text{log file}, table_i), & r(i, \text{table}) \geq \text{threshold} \\ 0, & r(i, \text{table}) < \text{threshold} \end{cases}$$

where r is a relevance score, i is an integer value, and the threshold is a predetermined system design requirement.

Evaluation logic 320 then determines a utilized data ratio that indicates proportion of the data in data warehouse 308 has been interacted with as per the log file. To determine this business relevance value, evaluation logic 320 uses the following business relevance function:

$$\text{utilized data ratio } d(\text{log file}) = \sum_{i=0}^{n} r(\text{log file}, table_i) * C(\text{log file}, table_i)$$

where r is relevance score, i is an integer value, and C is an indicator function and is determined using the following:

$$C(\text{log file}, table_i) = \begin{cases} r(\text{log file}, table_i), & r(i, \text{table}) \geq \text{threshold} \\ 0, & r(i, \text{table}) < \text{threshold} \end{cases}$$

where r is the relevance score, i is an integer value, and the threshold is a predetermined system design requirement.

Based on the business relevance value between the log file and the business analysis objective and the utilized data ratio at which the data in the data warehouse has been interacted with, evaluation logic 320 identifies suggestions as to which log files should be searched for particular data. For example, if evaluation logic 320 determines that the business relevance value is above a business relevance value threshold but the utilized data ratio is below a utilized data ratio threshold, then evaluation logic 320 identifies the log file to be a valuable log file and that the log file contains more context information. If evaluation logic 320 determines that the business relevance value is above the business relevance value threshold and the utilized data ratio is above the utilized data ratio threshold, then evaluation logic 320 identifies the data in data warehouse 308 as an alternative and that no more valuable data may be obtained from the log. Thus, the mechanisms of the illustrative embodiments identify suggestions as to which log files should be searched for particular data.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
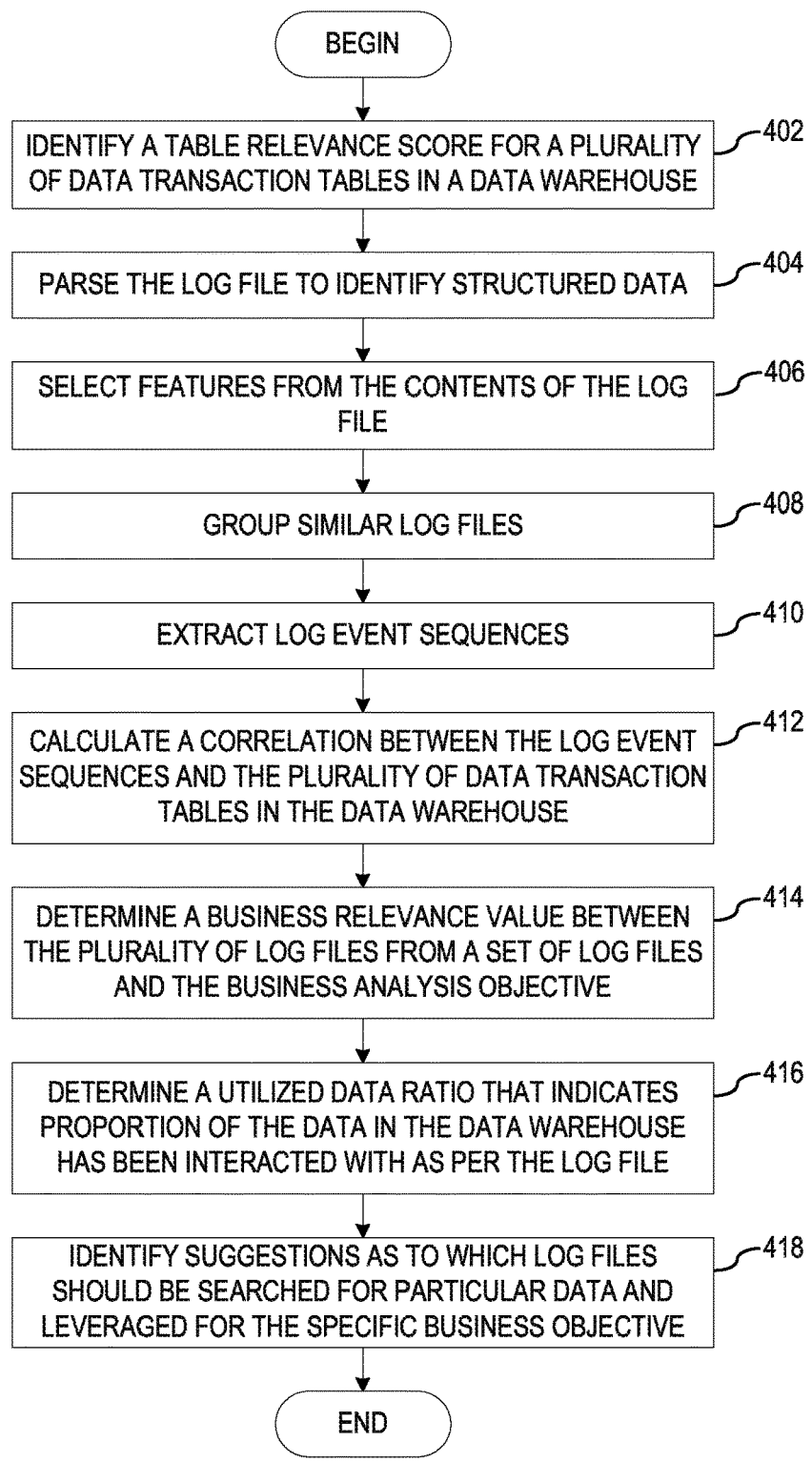
FIG. 4 depicts one exemplary operation performed by a log file evaluation mechanism in identifying suggestions as to which log files should be searched for particular data in accordance with an illustrative embodiment.

FIG. 4 depicts one exemplary operation performed by a log file evaluation mechanism in identifying suggestions as to which log files should be searched for particular data in accordance with an illustrative embodiment. As the operation begins, the log file evaluation mechanism identifies a table relevance score for a plurality of data transaction tables from a set of data transaction tables in a data warehouse based on the an associated table identifier in a data dictionary and a given business analysis objective (step 402). For a plurality of log files from a set of log files, the log file evaluation mechanism parses the log file to identify structured data (step 404). That is, each of the log files in the set of log files have some sort of data structure and the log file evaluation mechanism utilizes one or more predefined rules or guides to parse each log file and identify patterns in the log file and thereby detect the structure(s) of the data in the log file.

Utilizing the identified data structure(s) of the plurality of log files, the log file evaluation mechanism selects features from the contents of the log file, which should be a useful subset of the dimensions of original data and thus, is used to classify potential log events (step 406). That is, the data transaction tables in the data warehouse are organized around the business purposes and the log files associated with the data transaction tables are organized around the foreground/background events of interaction with the data transaction tables, which do not distinguish between business purposes. Thus, the log file evaluation mechanism uses unsupervised clustering to select the features from candidate fields in structured data of the set of log files. Based on the identified features, the log file evaluation mechanism groups similar log files (step 408) based on one or more of Euclidean distance analysis, Manhattan distance analysis, text similarity, or the like.

From the structured data of the grouped log files, the log file evaluation mechanism extracts log event sequences (step 410). That is, using the grouped structure log files, grouped by the identified features, the log file evaluation mechanism orders each of the groups by time thereby generating a set of log event sequences. Utilizing the set of log event sequences, the log file evaluation mechanism calculates a correlation between the log event sequences and the plurality of data transaction tables in the data warehouse (step 412).

With the highest correlate log sequence determined for the plurality of data transaction tables in the data warehouse, the log file evaluation mechanism determines a business relevance value between the plurality of log files in the set of log files and the business analysis objective (step 414). The business relevance value indicates the relative degree of value of the log file to the business based on relational data, i.e. the potential value of the data in the log file with the higher the business relevance value, the higher the business coverage of the log file. To determine this business relevance value, the log file evaluation mechanism uses the following business relevance function:

$$\text{business relevance value(log file)} = \sum_{i=0}^{n} C(\text{log file}, table_i) * tr(table_i)$$

where tr is the table relevance score, i is an integer value, and C is an indicator function and is determined using the following:

$$C(\text{log file}, table_i) = \begin{cases} r(\text{log file}, table_i), & r(i, \text{table}) \geq \text{threshold} \\ 0, & r(i, \text{table}) < \text{threshold} \end{cases}$$

where r is the relevance score, i is an integer value, and the threshold is a predetermined system design requirement.

The log file evaluation mechanism then determines a utilized data ratio that indicates proportion of the data in the data warehouse has been interacted with as per the log file (step 416). To determine this business relevance value, the log file evaluation mechanism uses the following business relevance function:

$$\text{utilized data ratio } d(\log \text{ file}) = \sum_{i=0}^{n} r(\log \text{ file}, table_i) * C(\log \text{ file}, table_i)$$

where r is the relevance score, i is an integer value, and C is an indicator function and is determined using the following:

$$C(\log \text{ file}, table_i) = \begin{cases} r(\log \text{ file}, table_i), & r(i, table) \geq \text{threshold} \\ 0, & r(i, table) < \text{threshold} \end{cases}$$

where r is the relevance score, i is an integer value, and the threshold is a predetermined system design requirement.

Based on the business relevance value between the log file and the business analysis objective and the utilized data ratio at which the data in the data warehouse has been interacted with, the log file evaluation mechanism identifies suggestions as to which log files should be searched for particular data and leveraged for the specific business objective (step 418), with the operation terminating thereafter.

Figure 5:
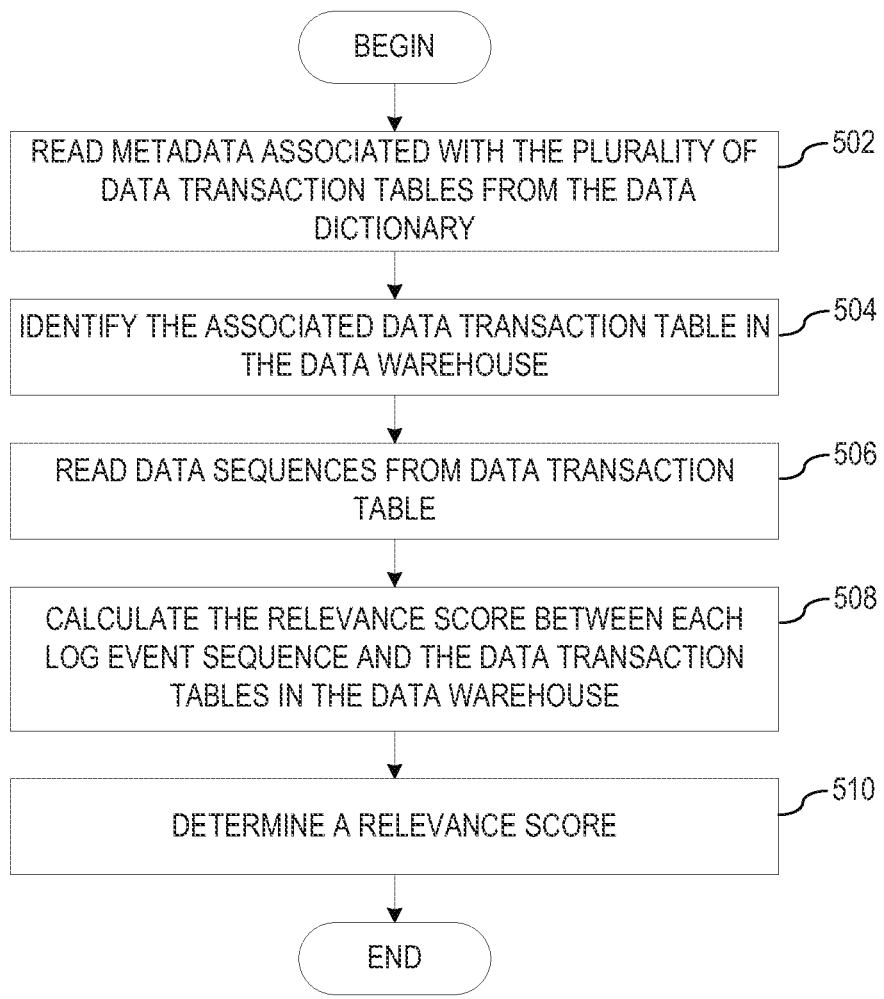
FIG. 5 depicts one exemplary operation performed by a log file evaluation mechanism in calculating a correlation between the log event sequences and a plurality of data transaction tables in the data warehouse in accordance with an illustrative embodiment.

FIG. 5 depicts one exemplary operation performed by a log file evaluation mechanism in calculating a correlation between the log event sequences and the plurality of data transaction tables in the data warehouse in accordance with an illustrative embodiment. To do this, as the operation begins, the log file evaluation mechanism reads metadata associated with the plurality of data transaction tables from the data dictionary (step 502). The log file evaluation mechanism identifies the associated data transaction table in the data warehouse (step 504) and reads data sequences from data transaction table (step 506). The log file evaluation mechanism calculates the relevance score between each log event sequence and the plurality of data transaction tables in the data warehouse (step 508) using the following correlation score function:

$$p(\log \text{ sequence, table}) = \frac{\sum_{i=0}^{N^{log}} \sum_{j=0}^{N^{table}} b(t_i^{log} - t_j^{table})}{\max(N^{log}, N^{table})}$$

with $$b(t_i - t_j) = \begin{cases} 1, & \text{for } |t_i - t_j| < \text{threshold} \\ 0, & \text{otherwise} \end{cases}$$

where p is the correlation score, b is an indicator function, t is a time that the log event is generated or the data in the table is recorded, i and j are integer values, and the threshold is a predetermined system design requirement. Based on the determined correlation, the log file evaluation mechanism determines a relevance score r (step 510) using the following correlation value function:

relevance score r(log file,table)=max(p(log sequence, table)).

Thus, for each log event sequence and associated data transaction tables, the log file evaluation mechanism determines the log sequence with the highest correlation value to a particular data transaction table in the data warehouse. That is, for each log sequence related to a particular data transaction table in the data warehouse, a relevance score is determined that is in the range from 0 to 1, where the higher the value the higher the correlation score between the log sequence and the data transaction table in the data warehouse. The operation terminates thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for generating important values from a variety of server log files. The mechanisms identify a relevance score between table identifiers in data dictionary and a given business analysis objective, the table identifiers identifying the data transaction tables in a data warehouse for which a set of log files are generated when the data is interacted with. For a plurality of log files from a set of log files log in the server, the mechanisms parse the log file for structured data. The mechanisms group the identified structured data and extract log event sequences from the grouped structured data. The mechanisms then calculate a correlation between the log event sequences and a plurality of data transaction tables from a set of data transaction tables in the data warehouse as well as a business relevance value between each log file and the business analysis objective. The mechanisms then calculate a rate at which the data in the data warehouse has been interacted with as per the log file. Based on the business relevance value between the log file and the business analysis objective and the rate at which the data in the data warehouse has been interacted with, the mechanisms identifies suggestions as to which log files should be searched for particular data. Thus, the mechanisms of the illustrative embodiments not only explore the data in the log files but also provide suggestions as to which log files should be searched for particular data.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a process and a memory coupled to the processor, for identifying suggestions as to which log files associated with data in a data warehouse to search for particular data, the method comprising:
   utilizing an identified data structure of a plurality of log files from a set of log files, selecting, by feature selection logic specifically configured by a log file evaluation mechanism within the data processing system, features from the contents of the log file;
   grouping, by the feature selection logic, log files in the set of log files together based on the selected features;
   from structured data of the grouped log files, extracting, by extraction logic specifically configured by the log file evaluation mechanism within the data processing system, log event sequences;
   calculating, by correlation logic specifically configured by the log file evaluation mechanism within the data processing system, a correlation between the log event sequences and a plurality of data transaction tables from a set of data transaction tables in the data warehouse;
   utilizing a highest valued correlate log sequence for the plurality of data transaction tables, determining, by the correlation logic, a business relevance value between the plurality of log files and a business analysis objective, wherein determining the business relevance value between each log file in the set of log files and the business analysis objective utilizes the following business relevance function:

$$\text{business relevance value(log file)} = \sum_{i=0}^{n} C(\text{log file}, table_i) * \text{tr}(table_i)$$

where tr is the table relevance score, i is an integer value, and C is an indicator function and is determined using the following:

$$C(\text{log file}, table_i) = \begin{cases} r(\text{log file}, table_i), & r(i, \text{table}) \geq \text{threshold} \\ 0, & r(i, \text{table}) < \text{threshold} \end{cases}$$

where r is the relevance score, i is an integer value, and the threshold is a predetermined system design requirement;
   determining, by evaluation logic specifically configured by the log file evaluation mechanism within the data processing system, a utilized data ratio that indicates a proportion of the data in the data warehouse that has been interacted with as per the associated log file; and
   identifying, by the evaluation logic, suggestions as to which log files in the set of log files should be searched for particular data based on the business relevance value and the utilized data ratio.

2. The method of claim 1, wherein calculating the correlation between the log event sequences and the plurality of data transaction tables comprises:
   reading, by the correlation logic, metadata associated with the plurality of data transaction tables from a data dictionary;
   identifying, by the correlation logic, an associated data transaction table in the data warehouse;
   reading, by the correlation logic, data sequences from the data transaction table;
   calculating, by the correlation logic, a relevance score between each log event sequence and the data transaction tables in the data warehouse thereby forming a set of relevance scores; and
   determining, by the correlation logic, a maximum relevance score from the set of relevance scores.

3. The method of claim 2, wherein calculating the relevance score between each log event sequence and the plurality of data transaction tables uses the following correlation score function:

$$p(\text{log sequence, table}) = \frac{\sum_{i=0}^{N^{log}} \sum_{j=0}^{N^{table}} b(t_i^{log} - t_j^{table})}{\max(N^{log}, N^{table})}$$

with $$b(t_i - t_j) = \begin{cases} 1, & \text{for } |t_i - t_j| < \text{threshold} \\ 0, & \text{otherwise} \end{cases}$$

where p is the correlation score, b is an indicator function, t is a time that the log event is generated or the data in the table is recorded, i and j are integer values, and the threshold is a predetermined system design requirement.

4. The method of claim 3, wherein determining the maximum relevance score from the set of relevance scores uses the following correlation value function:

relevance score r(log file,table)=max(p(log sequence, table)).

5. The method of claim 1, wherein determining the utilized data ratio that indicates the proportion of the data in the data warehouse that has been interacted with as per the associated log file utilizes the following business relevance function:

$$\text{utilized data ratio } d \text{ (log file)} = \sum_{i=0}^{n} r(\text{log file}, table_i) * C(\text{log file}, table_i)$$

where r is the relevance score, i is an integer value, and C is an indicator function, and is determined using the following:

$$C(\text{log file}, table_i) = \begin{cases} r(\text{log file}, table_i), & r(i, \text{table}) \geq \text{threshold} \\ 0, & r(i, \text{table}) < \text{threshold} \end{cases}$$

where r is the relevance score, i is an integer value, and the threshold is a predetermined system design requirement.

6. The method of claim 1, wherein the identified data structure of the plurality of log files in a set of log files is identified by parsing, by parsing logic specifically configured by the log file evaluation mechanism within the data processing system, each log file to identify the structured data.

7. The method of claim 1, wherein grouping the log files in the set of log files together based on the selected features is performed using an Euclidean distance analysis, a Manhattan distance analysis, or text similarity.

8. A non-transitory computer readable storage medium having a computer readable program stored therein, wherein the computer readable program, when executed on a computing device, causes the computing device to:

utilizing an identified data structure of a plurality of log file from a set of log files, select, utilizing feature selection logic of a log file evaluation mechanism specifically configured by readable program, features from the contents of the log file;

group, utilizing the feature selection logic, log files in the set of log files together based on the selected features;

from structured data of the grouped log files, extract, utilizing extraction logic of the log file evaluation mechanism specifically configured by the computer readable program, log event sequences;

calculate, utilizing correlation logic of the log file evaluation mechanism specifically configured by the computer readable program, a correlation between the log event sequences and a plurality of data transaction tables from a set of data transaction tables in the data warehouse;

utilizing a highest valued correlate log sequence for the plurality of data transaction tables, determine, utilizing the correlation logic, a business relevance value between the plurality of log files and a business analysis objective, wherein the computer readable program to determine the business relevance value between each log file in the set of log files and the business analysis objective utilizes the following business relevance function:

$$\text{business relevance value(log file)} = \sum_{i=0}^{n} C(\text{log file}, table_i) * tr(table_i)$$

where tr is the table relevance score, i is an integer value, and C is an indicator function and is determined using the following:

$$C(\text{log file}, table_i) = \begin{cases} r(\text{log file}, table_i), & r(i, \text{table}) \geq \text{threshold} \\ 0, & r(i, \text{table}) < \text{threshold} \end{cases}$$

where r is the relevance score, i is an integer value, and the threshold is a predetermined system design requirement;

determine, utilizing evaluation logic of the log file evaluation mechanism specifically configured by the computer readable program, a utilized data ratio that indicates a proportion of the data in the data warehouse that has been interacted with as per the associated log file; and identify, utilizing the evaluation logic, suggestions as to which log files in the set of log files should be searched for particular data based on the business relevance value and the utilized data ratio.

9. The non-transitory computer readable storage medium of claim 8, wherein the computer readable program to calculate the correlation between the log event sequences and the plurality of data transaction tables further causes the computing device to:

read, utilizing the correlation logic, metadata associated with the plurality of data transaction tables from a data dictionary;

identify, utilizing the correlation logic, an associated data transaction table in the data warehouse;

read, utilizing the correlation logic, data sequences from the data transaction table;

calculate, utilizing the correlation logic, a relevance score between each log event sequence and the data transaction tables in the data warehouse thereby forming a set of relevance scores; and determine, utilizing the correlation logic, a maximum relevance score from the set of relevance scores.

10. The non-transitory computer readable storage medium of claim 9, wherein the computer readable program to calculate the relevance score between each log event sequence and the plurality of data transaction tables uses the following correlation score function:

$$p(\text{log sequence}, \text{table}) = \frac{\sum_{i=0}^{N^{log}} \sum_{j=0}^{N^{table}} b(t_i^{log} - t_j^{table})}{\max(N^{log}, N^{table})}$$

with $$b(t_i - t_j) = \begin{cases} 1, & \text{for } |t_i - t_j| < \text{threshold} \\ 0, & \text{otherwise} \end{cases}$$

where p is the correlation score, b is an indicator function, t is a time that the log event is generated or the data in the table is recorded, i and j are integer values, and the threshold is a predetermined system design requirement.

11. The non-transitory computer readable storage medium of claim 10, wherein the computer readable program to determine the maximum relevance score from the set of relevance scores uses the following correlation value function:

relevance score $r$(log file,table)=max($p$(log sequence, table)).

12. The non-transitory computer readable storage medium of claim 8, wherein the computer readable program to determine the utilized data ratio that indicates the proportion of the data in the data warehouse that has been interacted with as per the associated log file utilizes the following business relevance function:

$$\text{utilized data ratio } d \text{ (log file)} = \sum_{i=0}^{n} r(\text{log file, } table_i) * C(\text{log file, } table_i)$$

where r is the relevance score, i is an integer value, and C is an indicator function, and is determined using the following:

$$C(\text{log file, } table_i) = \begin{cases} r(\text{log file, } table_i), & r(i, \text{table}) \geq \text{threshold} \\ 0, & r(i, \text{table}) < \text{threshold} \end{cases}$$

where r is the relevance score, i is an integer value, and the threshold is a predetermined system design requirement.

13. An apparatus comprising:
a processor; and
a memory coupled to the processor, wherein the memory comprises instructions which, when executed by the processor, cause the processor to:
utilizing an identified data structure of a plurality of log files from a set of log files, select, utilizing feature selection logic of a log file evaluation mechanism specifically configured by the instructions, features from the contents of the log file;
group, utilizing the feature selection logic, log files in the set of log files together based on the selected features;
from structured data of the grouped log files, extract, utilizing extraction logic of the log file evaluation mechanism specifically configured by the instructions, log event sequences;
calculate, utilizing correlation logic of the log file evaluation mechanism specifically configured by instructions, a correlation between the log event sequences and a plurality of data transaction tables from a set of data transaction tables in the data warehouse;
utilizing a highest valued correlate log sequence for the plurality of data transaction tables, determine, utilizing the correlation logic, a business relevance value between the plurality of log files and a business analysis objective, wherein the instructions to determine the business relevance value between each log file in the set of log files and the business analysis objective utilizes the following business relevance function:

$$\text{business relevance value}(\text{log file}) = \sum_{i=0}^{n} C(\text{log file, } table_i) * tr(table_i)$$

where tr is the table relevance score, i is an integer value, and C is an indicator function and is determined using the following:

$$C(\text{log file, } table_i) = \begin{cases} r(\text{log file, } table_i), & r(i, \text{table}) \geq \text{threshold} \\ 0, & r(i, \text{table}) < \text{threshold} \end{cases}$$

where r is the relevance score, i is an integer value and the threshold is a predetermined system design requirement;
determine, utilizing evaluation logic of the log file evaluation mechanism specifically configured by the instructions, a utilized data ratio that indicates a proportion of the data in the data warehouse that has been interacted with as per the associated log file; and
identify, utilizing the evaluation logic, suggestions as to which log files in the set of log files should be searched for particular data based on the business relevance value and the utilized data ratio.

14. The apparatus of claim 13, wherein the instructions to calculate the correlation between the log event sequences and the plurality of data transaction tables further cause the processor to:
read, utilizing the correlation logic, metadata associated with the plurality of data transaction tables from a data dictionary;
identify, utilizing the correlation logic, an associated data transaction table in the data warehouse;
read, utilizing the correlation logic, data sequences from the data transaction table;
calculate, utilizing the correlation logic, a relevance score between each log event sequence and the data transaction tables in the data warehouse thereby forming a set of relevance scores; and
determine, utilizing the correlation logic, a maximum relevance score from the set of relevance scores.

15. The apparatus of claim 14, wherein the instructions to calculate the relevance score between each log event sequence and the plurality of data transaction tables uses the following correlation score function:

$$p(\text{log sequence, table}) = \frac{\sum_{i=0}^{N^{log}} \sum_{j=0}^{N^{table}} b(t_i^{log} - t_j^{table})}{\max(N^{log}, N^{table})}$$

with $$b(t_i - t_j) = \begin{cases} 1, & \text{for } |t_i - t_j| < \text{threshold} \\ 0, & \text{otherwise} \end{cases}$$

where p is the correlation score, b is an indicator function, t is a time that the log event is generated or the data in the table is recorded, i and j are integer values, and the threshold is a predetermined system design requirement.

16. The apparatus of claim 15, wherein the instructions to determine the maximum relevance score from the set of relevance scores uses the following correlation value function:

relevance score $r(\text{log file,table}) = \max(p(\text{log sequence, table}))$.

17. The apparatus of claim 13, wherein the instructions to determine the utilized data ratio that indicates the proportion of the data in the data warehouse that has been interacted with as per the associated log file utilizes the following business relevance function:

$$\text{utilized data ratio } d \text{ (log file)} = \sum_{i=0}^{n} r(\text{log file, } table_i) * C(\text{log file, } table_i)$$

where r is the relevance score, i is an integer value, and C is an indicator function, and is determined using the following:

$$C(\text{log file}, table_i) = \begin{cases} r(\text{log file}, table_i), & r(i, \text{table}) \geq \text{threshold} \\ 0, & r(i, \text{table}) < \text{threshold} \end{cases}$$

where r is the relevance score, i is an integer value, and the threshold is a predetermined system design requirement.

\* \* \* \* \*